United States Patent
Ress, Jr. et al.

(10) Patent No.: US 9,726,032 B2
(45) Date of Patent: Aug. 8, 2017

(54) GAS TURBINE ENGINE DIFFUSER SYSTEM FOR A HIGH PRESSURE (HP) COMPRESSOR

(71) Applicant: Rolls-Royce North American Technologies, Inc., Indianapolis, IN (US)

(72) Inventors: Robert A. Ress, Jr., Carmel, IN (US); Andrew Swift, Uttoxeter (GB)

(73) Assignees: Rolls-Royce American Technologies, Inc., Indianapolis, IN (US); Rolls-Royce PLC, London (GB)

( * ) Notice: Subject to any disclaimer, the term of this patent is extended or adjusted under 35 U.S.C. 154(b) by 628 days.

(21) Appl. No.: 14/137,987

(22) Filed: Dec. 20, 2013

(65) Prior Publication Data

US 2014/0255181 A1    Sep. 11, 2014

Related U.S. Application Data

(60) Provisional application No. 61/775,381, filed on Mar. 8, 2013.

(51) Int. Cl.
*F01D 11/00* (2006.01)
*F04D 29/08* (2006.01)
(Continued)

(52) U.S. Cl.
CPC ............ *F01D 11/005* (2013.01); *F01D 9/065* (2013.01); *F02C 7/28* (2013.01); *F04D 29/083* (2013.01);
(Continued)

(58) Field of Classification Search
CPC .......... F02C 7/28; F01D 9/065; F01D 11/005; F04D 29/083; F04D 29/444
See application file for complete search history.

(56) References Cited

U.S. PATENT DOCUMENTS

| 3,832,089 A | 8/1974 | Moellmann |
| 6,488,469 B1 | 12/2002 | Youssef et al. |

(Continued)

FOREIGN PATENT DOCUMENTS

| EP | 2096266 A1 | 9/2009 |
| WO | WO-01/18404 A1 | 3/2001 |
| WO | WO-2005/042946 A1 | 5/2005 |

OTHER PUBLICATIONS

International Search Report for PCT/US2013/073216 mailed Mar. 12, 2014.

*Primary Examiner* — Gregory Anderson
*Assistant Examiner* — Maxime Adjagbe
(74) *Attorney, Agent, or Firm* — Fishman Stewart PLC

(57) ABSTRACT

A gas turbine engine includes a compressor assembly that is rotationally coupled to a shaft. The engine includes a radial diffuser assembly coupled to a shroud of the compressor assembly and positioned to receive compressed air from a centrifugal impeller. The radial diffuser assembly includes a first arcuate wall and a second wall, and a near axial diffuser coupled to the radial diffuser assembly and positioned to receive the compressed air from the radial diffuser assembly. The gas turbine includes a gas seal coupled between the second wall and a wall of the near axial diffuser, the gas seal configured to prevent the compressed air from passing through the seal while allowing relative motion between the radial diffuser assembly and the near axial diffuser.

20 Claims, 5 Drawing Sheets

(51) Int. Cl.
    *F04D 29/44*         (2006.01)
    *F01D 9/06*          (2006.01)
    *F02C 7/28*          (2006.01)

(52) U.S. Cl.
    CPC ........ *F04D 29/444* (2013.01); *F05D 2250/52* (2013.01); *Y10T 29/49321* (2015.01)

(56) References Cited

U.S. PATENT DOCUMENTS

| | | |
|---|---|---|
| 6,589,015 B1 | 7/2003 | Roberts et al. |
| 7,565,796 B2 | 7/2009 | Eleftheriou et al. |
| 7,628,583 B2 | 12/2009 | Roberts et al. |
| 7,717,672 B2 | 5/2010 | Barton et al. |
| 7,798,777 B2 | 9/2010 | Moussa et al. |
| 7,841,187 B2 | 11/2010 | Behaghel et al. |
| 7,908,869 B2 | 3/2011 | Ivakitch et al. |
| 8,220,268 B2 | 7/2012 | Callas |
| 2005/0242522 A1* | 11/2005 | Lejars ............... F01D 11/005 277/584 |
| 2007/0036646 A1 | 2/2007 | Nguyen et al. |
| 2007/0241257 A1 | 10/2007 | Eleftheriou et al. |
| 2010/0047059 A1 | 2/2010 | Gentils et al. |
| 2010/0316484 A1 | 12/2010 | Jasko et al. |

\* cited by examiner

GAS TURBINE ENGINE DIFFUSER SYSTEM FOR A HIGH PRESSURE (HP) COMPRESSOR

CROSS-REFERENCE TO RELATED APPLICATIONS

This application claims priority to U.S. Provisional Patent Application No. 61/775,381 filed Mar. 8, 2013, the contents of which are hereby incorporated in their entirety.

FIELD OF TECHNOLOGY

An improved diffuser system for a centrifugal compressor is disclosed, and more particularly, a centrifugal compressor assembly including a radial diffuser section that is isolated from a structural load path of an axial diffuser section of the centrifugal compressor assembly.

BACKGROUND

Gas turbine engines such as those used as aircraft propulsion units include turbojet and turbofan types. A turbofan engine includes a fan section, a compression section, a combustion section, a high pressure turbine section and a low pressure turbine section. The fan section is coupled to the low pressure turbine section while the compression section is coupled to the high pressure turbine section. The compression section together with the combustion section and the high pressure turbine section form the core of the engine. The compression section can be a single unit driven by the high pressure turbine or it may be split into an intermediate pressure compressor section followed by a high pressure compressor section driven by an intermediate pressure turbine and a high pressure turbine respectively. The compression sections can include axial compression stages, centrifugal stages or a combination of both.

It has become increasingly desirable to provide improved compressor performance by reducing the amount of air leakage in compressors of turbofan engines including those employing centrifugal stages. The centrifugal compressor typically includes a centrifugal impeller having blades that are enshrouded by a static impeller shroud. Minimizing the clearance between the impeller blades and the impeller shroud optimizes the capacity of the impeller in pressurizing air to the elevated pressures desired for peak engine performance.

The shroud for a centrifugal compressor is typically mounted to an adjacent compressor casing if present, or to a downstream diffuser assembly. The compressor casing or diffuser assembly is mounted to a support frame or other static component. The support frame or casing structure typically forms part of the structural backbone of the engine. This type of shroud mounting can be problematic in that carcass distortions resulting from asymmetric structural loading (e.g., from take-off rotation, maneuver, and landing) are transmitted to the shroud, resulting in a greater than desired impeller tip clearance.

Centrifugal compressors typically employ a radial diffusing section followed by a turning duct or elbow that is a vaned axial or near axial diffusing and de-swirl section. In some applications, the turning duct and vaned axial or near axial diffusing and de-swirl section is replaced with a set of pipe diffuser assemblies. When a rotor support bearing is located aft of the centrifugal compressor assembly, the bearing housing is typically mounted through the radial diffuser section with sump services accommodated within the radial diffuser. On pipe systems, sump services are accommodated within the radial diffuser section or in an area between pipe assemblies.

Diffuser sections are typically joined together with a bolted flange arrangement at an outboard interface point. This bolted flange joint is a major structural interface of the gas turbine engine and may include an aft leg of the casing assembly. Thus, in a typical arrangement, carcass bending loads pass through the bolted flange. As such, heavy g-loads and asymmetric structural loading (including take-off rotation, maneuver and landing) can cause local distortions at the diffuser outboard flange, which can be in turn transferred to the shroud through its mounting point to the diffuser.

Shrouds are typically designed having adequate clearance such that interference does not occur during the most extreme anticipated carcass distortions that can occur during engine operation, due to mechanical loading, thermal loading, component wear, and the like. Distortion that occurs in the shroud during engine operation can increase component clearance, resulting in excess air leakage in the compressor, leading to overall poor engine performance. Reducing the propensity for shroud distortion would be helpful and could improve compressor performance.

BRIEF DESCRIPTION OF THE DRAWINGS

While the claims are not limited to a specific illustration, an appreciation of the various aspects is best gained through a discussion of various examples thereof. Referring now to the drawings, exemplary illustrations are shown in detail. Although the drawings represent the illustrations, the drawings are not necessarily to scale and certain features may be exaggerated to better illustrate and explain an innovative aspect of an example. Further, the exemplary illustrations described herein are not intended to be exhaustive or otherwise limiting or restricted to the precise form and configuration shown in the drawings and disclosed in the following detailed description. Exemplary illustrations are described in detail by referring to the drawings as follows:

DETAILED DESCRIPTION

Exemplary illustrations of a diffuser system for a centrifugal compressor of a gas turbine are described herein and shown in the attached drawings. Exemplary assemblies include a gas turbine engine that includes a compressor assembly that is rotationally coupled to a shaft, the compressor assembly having a centrifugal impeller. A radial diffuser assembly is coupled to a shroud of the compressor assembly and positioned to receive compressed air from the centrifugal impeller. The radial diffuser assembly includes a first arcuate wall and a second wall, and a near-axial diffuser coupled to the radial diffuser assembly and positioned to receive the compressed air from the radial diffuser assembly. A gas seal is coupled between the second wall and a wall of the near-axial diffuser, the gas seal configured to prevent the compressed air from passing through the seal while allowing relative motion between the radial diffuser assembly and the near-axial diffuser.

Another exemplary illustration includes a method of manufacturing a gas turbine engine that includes coupling a radial diffuser assembly to a shroud of a compressor assembly, wherein the radial diffuser assembly is positioned to receive compressed air from a centrifugal impeller, and wherein the radial diffuser assembly includes a first arcuate wall and a second wall. The method also includes coupling a near-axial diffuser to the radial diffuser assembly to receive the compressed air from the radial diffuser assembly, and coupling a gas seal between the second wall and a wall of the near-axial diffuser, the gas seal configured to prevent the compressed air from passing through the seal while allowing relative motion between the radial diffuser assembly and the near-axial diffuser.

The disclosed system and method provide structural tailoring of and isolation for a radial diffuser outer mount leg that provides a forward section that includes a radial diffuser and turning duct, and an aft section split therefrom having a vaned axial or near-axial diffusing and de-swirl assembly. The radial diffuser section is isolated from the structural load path and subsequent carcass distortions that leads to improved impeller-diffuser alignment and impeller tip control. Split rail diffusing provides reduced cost and allows for more robust fabrication methods. The system also includes a center sump that is supported through an axial diffuser/de-swirl assembly, and also includes center sump services through the axial diffuser/de-swirl assembly that allows for optimized aero performance in the radial diffuser.

Figure 1:
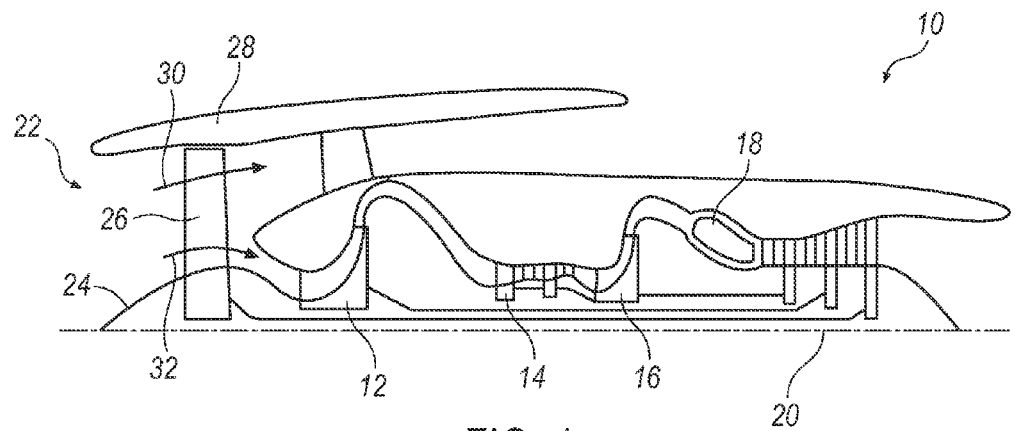
FIG. 1 illustrates a side schematic view of a gas turbine engine employing the improvements discussed herein.

Turning now to the drawings, FIG. 1 illustrates a schematic diagram of a gas turbine machine 10 utilizing the improvements disclosed herein. The gas turbine machine 10 includes a first centrifugal compressor 12, an axial compressor 14, a second centrifugal compressor 16, a combustor 18, and a turbine 20. A fan 22 includes a nosecone assembly 24, blade members 26, and a fan casing 28. Blade members 26 direct low pressure air to a bypass flow path 30 and to the compressor intake 32, which in turn provides airflow to compressor 12. The nosecone assembly 24 generates turbulent airflow, which in turn is directed across the surface of the blade member 26.

Figure 2:
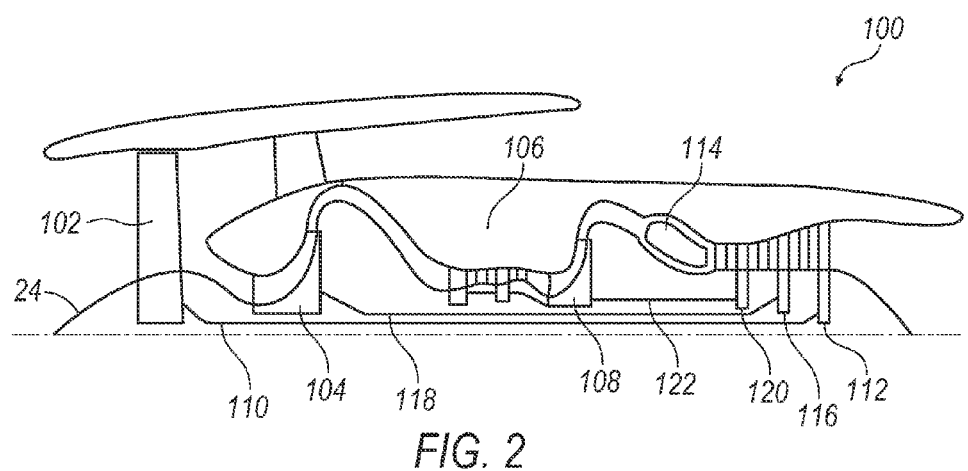
FIG. 2 illustrates a 3-spool turbofan engine with centrifugal compression system employing the improvements discussed herein.

FIG. 2 illustrates a schematic diagram of a three spool turbofan engine 100. Turbofan 100 includes a fan 102 coupled to a low pressure turbine (LPT) 112 through shaft 110, a single-stage centrifugal compressor assembly 104 coupled to an intermediate pressure turbine (IPT) 116 through shaft 118. Turbofan 100 includes a two-stage axial compressor assembly 106 and a single-stage centrifugal compressor 108 coupled to a high pressure turbine 120 through shafting 122. Turbines 120, 116, and 112 are driven by hot gases discharged from a combustion chamber 114.

Figure 3:
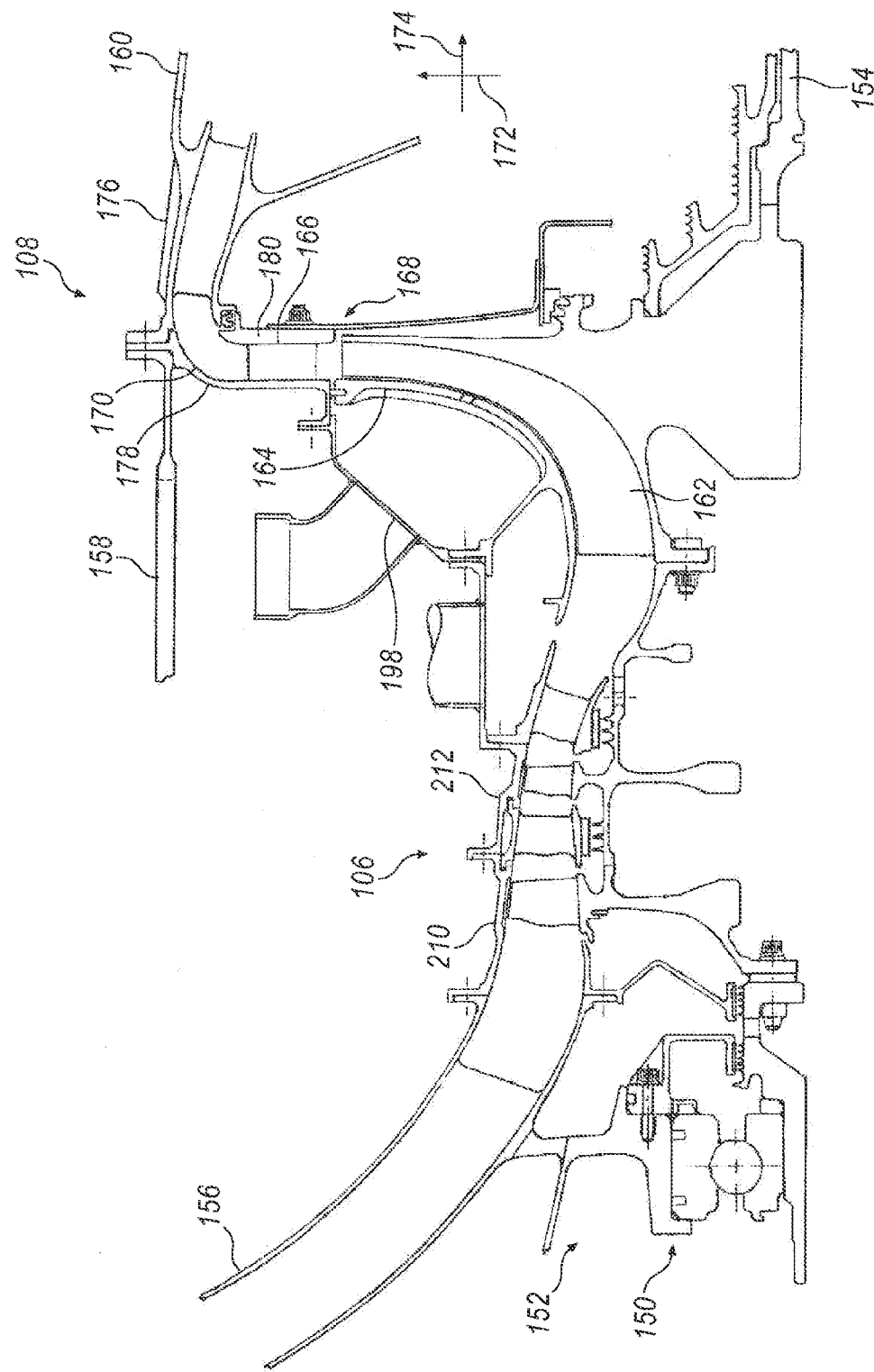
FIG. 3 illustrates a combined two stage axial, single stage centrifugal compression system employing the improvements discussed herein.

FIG. 3 illustrates a two-stage axial compressor 106 and a single-stage centrifugal compressor 108. A thrust bearing 150 provides a structural ground point 152 for rotating components of compressors 106, and 108. A transition duct 156 transitions compressed airflow from single-stage centrifugal compressor assembly 104 to two-stage axial compressor assembly 106. Structural components 158 and 160 form part of the main backbone of the engine and are structurally isolated from the inner compressor casings 210, 212 and 198 of compressors 106 and 108, as will be further illustrated. Compressor 108 includes a centrifugal impeller 162 that is attached to rotational shaft 154. A shroud 164 is positioned proximate impeller 162 and tip clearance (clearance between impeller 162 and shroud 164) is minimized. Structural component 158 is an open girder frame that provides assembly and maintenance access to compressor 108.

A radial diffuser assembly 166 includes a forward section and a turning duct, and an aft section made up of vaned axial or near axial diffusing passages. Assembly 166 is positioned proximate a discharge location 168 to receive compressed air that is discharged from impeller 162. Radial diffuser 166 includes an elbow or turning duct 170 that redirects airflow from radial diffuser 166 from passing in a radial direction 172 to approximately an axial direction 174. An axial or near-axial diffuser 176 is positioned proximate elbow 170 to receive compressed air from elbow 170 and pass the discharged air to a combustion chamber (such as combustion chamber 114 of FIG. 2). Axial or near-axial diffuser 176 discharges compressed air in generally axial direction 174.

During operation of gas turbine machine 10, carcass or outer case (not shown) distortions can occur due to mechanical loading, thermal loading, component wear, and the like. Because structural components 158 and 160 form part of the main backbone of the engine, they are subject or prone to experience the distortion and motion that can occur in the carcass. In order to minimize the impact of this distortion and reduce the propensity for the distortion to compromise compressor tip clearance, structural isolation is provided by enabling relative motion to occur between structural components 158, 160 and radial diffuser 166.

Figure 4:
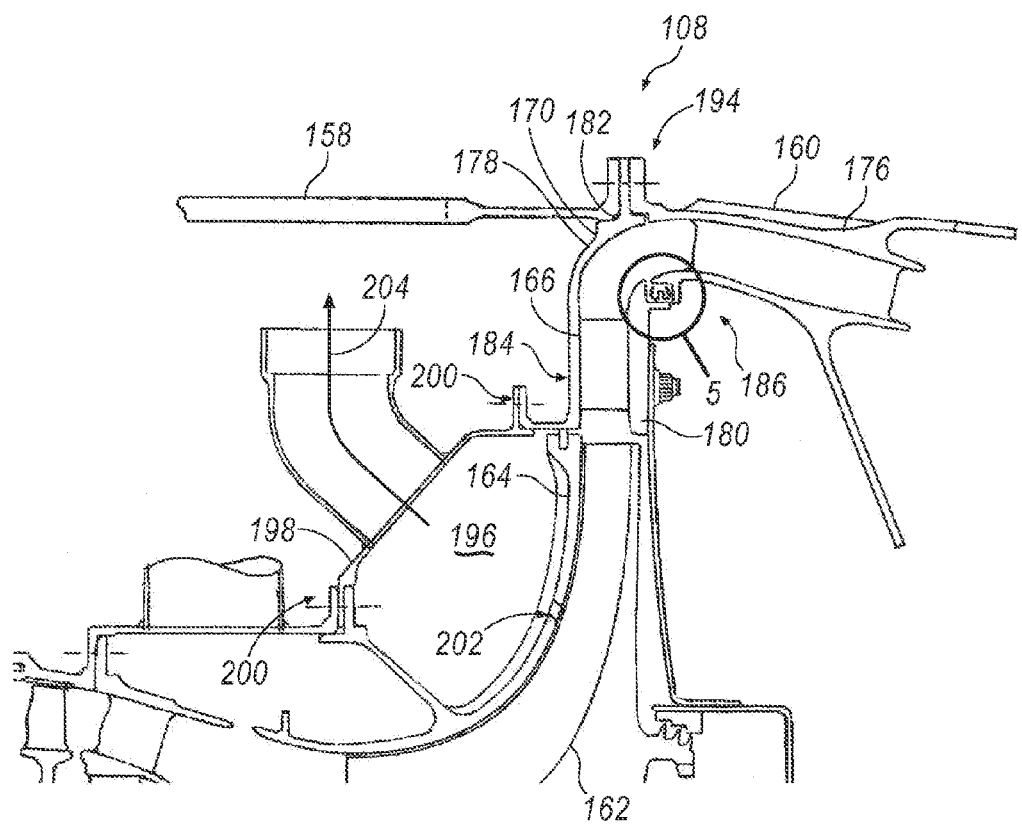
FIG. 4 illustrates compliant seal disposed between the radial diffuser section and the axial diffuser section of FIG. 3.

Accordingly, referring now to FIG. 4, elbow 170 of radial diffuser 166 includes an arcuate wall 178 and a second wall 180. Arcuate wall 178 includes a wall thickness that diminishes over its length and more particularly over its arced length. That is, arcuate wall 178 includes a first thickness at a first location 182, and a second thickness at a second location 184, and a generally decreasing thickness therebetween. In such fashion, arcuate wall 178 operates to form a cavity or passageway through which compressed air passes, and without leaking or otherwise passing air outside thereof, while also providing a generally non-structural connection between first and second locations 182, 184. In one embodiment, arcuate wall 178 is a nonstructural Inconel® 718 that is a brazed assembly.

Figure 5:
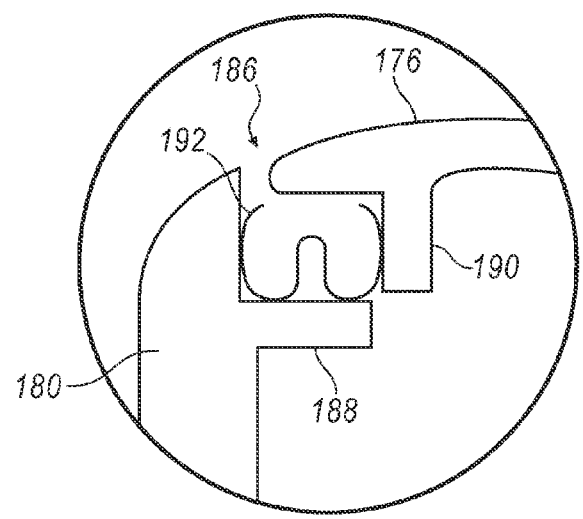
FIG. 5, taken from circle 5 of FIG. 4, illustrates an axial diffuser having a vaned or de-swirl assembly.

Near-axial diffuser 176 is also decoupled mechanically from radial diffuser 166 via a seal 186 that, in the illustrated embodiment, is a w-seal. W-seal 186 is further illustrated in FIG. 5 and includes a first seal flange 188 attached to wall 180 of radial diffuser 180, and a second seal flange 190 attached to axial diffuser 176. W-seal 186 includes a w-shaped and spring-loaded sealing element 192 which, when positioned and compressed between flanges 190 and wall 180, results in sealing compressed air from passing therethrough. Because of the shape of w-shaped element 192, relative motion may occur between wall 180 and diffuser 176 as element 192 compresses, while maintaining a seal and preventing air from passing therethrough. It will be appreciated that sealing element 192 could include other shaped geometric configurations. Alternately, a piston ring type seal arrangement could be incorporated to provide a compliant seal at this location.

Thus, because structural components 158, 160 provide support for diffuser 176 and for the geometric tailoring of elbow 170, the radial diffuser 166, shroud 164, and impeller 162 are structurally isolated therefrom. The diffuser system, including axial diffuser 176 and radial diffuser assembly 166 is joined together as a bolted joint 194 at an outboard interface point, as illustrated. Bolted joint 194 is a major structural interface of the gas turbine engine and includes the leg 160 of the outer combustor casing assembly. Thus, motion that can occur in components 158, 160, and 176 is isolated from components 162 and 164 at least through the compressive action of seal element 192 and through the ability of arcuate wall 178 to bend (having a relatively thin or 'flimsy' wall that bends and does not provide structural stiffness) while maintaining the seal of air therein. The curvature and variable wall thickness of arcuate wall 178 includes first thickness 182 and a lesser second thickness 184, which in one embodiment includes first thickness 182 that is positioned closer to bolted joint 194 than second thickness 184. Thus, arcuate wall 178 achieves a stiffness level that maintains the vaned radial diffuser section in proper alignment with the impeller discharge, thereby improving impeller tip clearance control.

According to one embodiment a bleed plenum 196 is provided that is formed by a wall material 198 having flanges 200 attached thereto. In this embodiment, shroud 164 includes a bleed slot 202 positioned therein. Bleed slot 202 provides a bleed for air passage therethrough to relieve pressure buildup, such that bleed air can pass 204 through bleed plenum 196. In order to reduce excessive force transfer to shroud 164 and radial diffuser 166, wall material in one embodiment is formed by a non-load bearing material that is attached to the radial diffuser and to the shroud.

Figure 7:
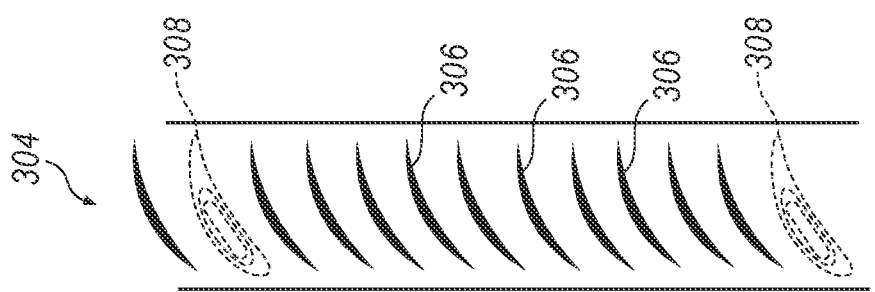
FIGS. 6 and 7 illustrate an axial diffuser that includes a vaned or de-swirl assembly.
Figure 6:
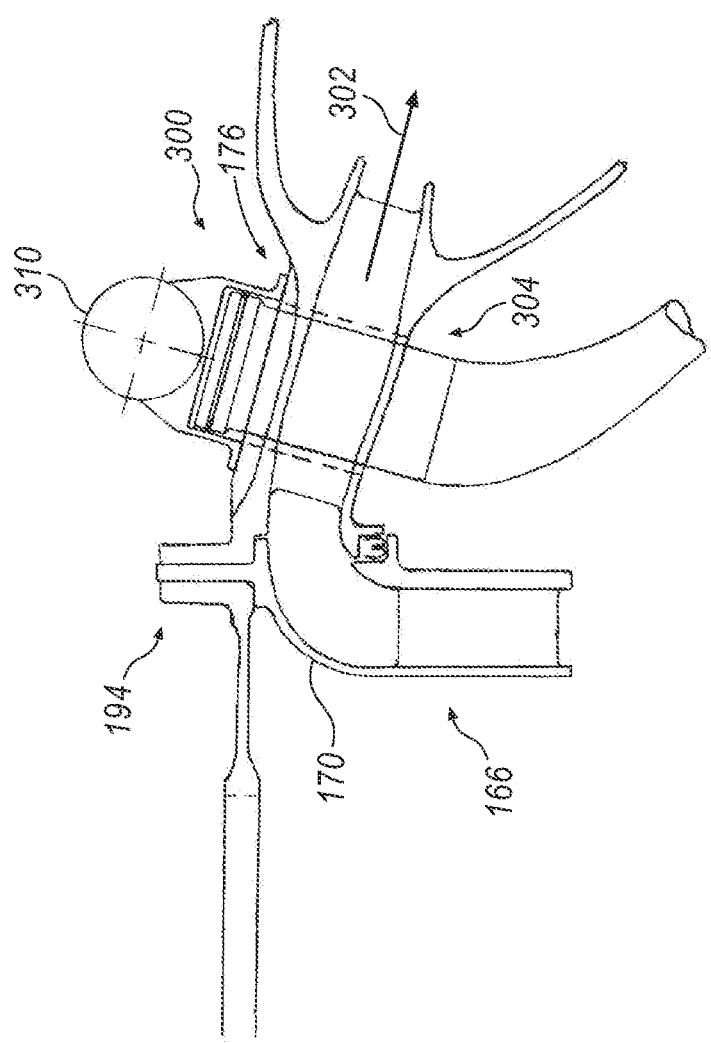

According to an alternative embodiment and referring to FIGS. 6 and 7, axial diffuser 176 could include a vaned or de-swirl assembly 300. As compressed air 302 passes through radial diffuser assembly 166 (including elbow 170) and into axial diffuser 176, air 302 tends to swirl as it passes therethrough, causing turbulence, loss of efficiency, and excessive pressure on components proximate combustion chamber 114. In addition and as shown in FIG. 7, such swirl tends to increase back-pressure and can cause an increased load on components proximate combustion chamber 114, which can further exacerbate the propensity for the overall diffuser assembly to cause impeller tip clearance issues. As such, de-swirl assembly 300 includes a de-swirl passage 304 that includes vanes 306.

A vaned axial or near axial diffusing and se-swirl assembly provides for access for services to the center sump. These services include but are not limited to oil supply, oil drain, a sump vent, and cool pressurized air for buffering the sump seals. That is, referring still to FIG. 7, vanes 306 include service struts 308 for providing the services described. In one embodiment there are eighty-eight vanes 306 and eight service struts 308. That is, a number of thick (relative to vanes 306) and hollow struts (five to ten, and eight in one embodiment as stated), are incorporated into the aft diffusing and de-swirl assembly. Between the struts 308 are vanes 306 numbering from a count of eighty to one hundred, and eighty-eight in one embodiment and as stated.

Figure 8:
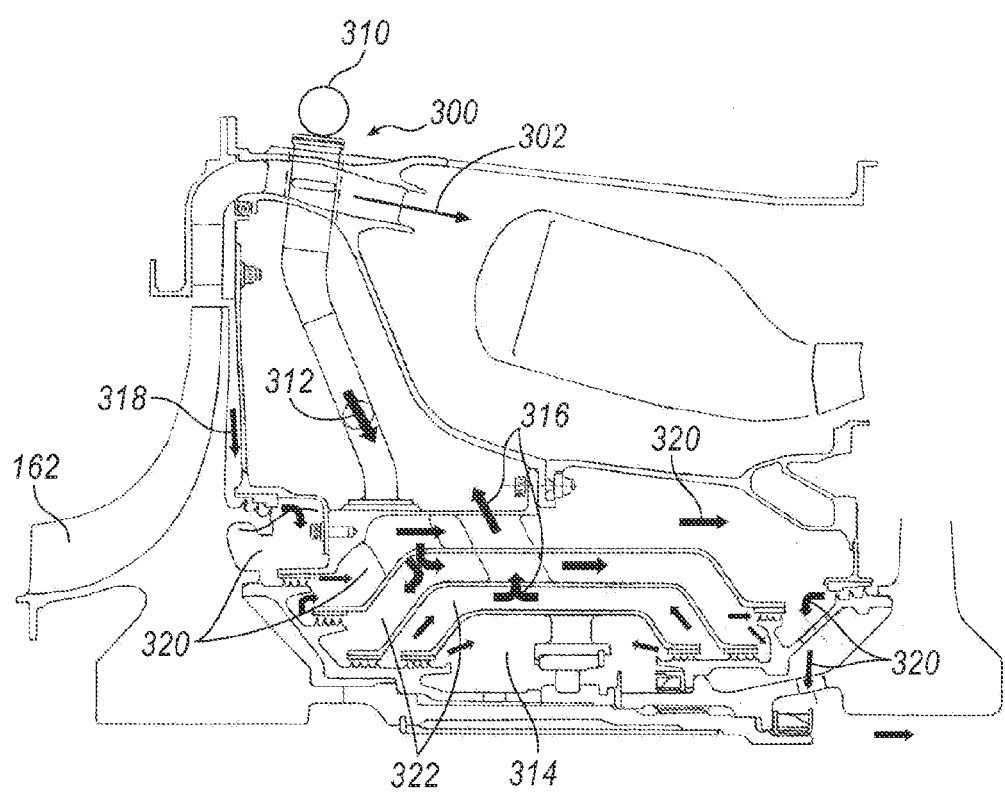
FIG. 8 illustrates an arrangement for services and for airflow channels.

Referring to FIG. 8, the arrangement for services and for airflow channels is illustrated. A manifold 310 draws air from, for instance, the centrifugal compressor assembly 104 on the IP spool. The relatively cool air from the IP spool passes 312 through one or more of the service struts 308 and passes through a number of buffering passages 322 in order to provide a multi-layer buffer of cool air around bearing compartment 314. The buffered and cool air exits 316 and is vented to, typically a low pressure (LP) turbine section. In order to further maintain bearing 314 at cool temperature, relatively warm air 318 passing aft of impeller 162 is directed through channels and apertures 320, avoiding the relatively hot compressor air from heating bearing compartment 314.

It will be appreciated that the aforementioned method and devices may be modified to have some components and steps removed, or may have additional components and steps added, all of which are deemed to be within the spirit of the present disclosure. Even though the present disclosure has been described in detail with reference to specific embodiments, it will be appreciated that the various modification and changes can be made to these embodiments without departing from the scope of the present disclosure as set forth in the claims. The specification and the drawings are to be regarded as an illustrative thought instead of merely restrictive thought.

What is claimed is:

1. A gas turbine engine comprising:
   a compressor assembly rotationally coupled to a shaft, the compressor assembly having a centrifugal impeller;
   a radial diffuser assembly coupled to a shroud of the compressor assembly and positioned to receive compressed air from the centrifugal impeller, the radial diffuser assembly having a first arcuate wall and a second wall;
   another diffuser coupled to the radial diffuser assembly and positioned to receive the compressed air from the radial diffuser assembly;
   a gas seal coupled between the second wall and a wall of the another diffuser, the gas seal configured to prevent the compressed air from passing through the seal while allowing relative motion between the radial diffuser assembly and the another diffuser;
   a bleed slot positioned within the shroud proximate the centrifugal impeller; and
   a bleed plenum formed in part by a wall of the shroud and by a non-load bearing material that is attached to the radial diffuser assembly and to the shroud via a pair of flanges that are in direct contact with one another, wherein bleed air that passes through the bleed slot passes directly from the centrifugal impeller, through the bleed slot, and into the bleed plenum.

2. The gas turbine engine as claimed in claim 1, wherein the first arcuate wall includes a variable thickness about an arcuate portion thereof.

3. The gas turbine engine as claimed in claim 2, the gas turbine engine further comprising an outer structure that is bolted at a bolted joint to the radial diffuser assembly wherein the variable thickness includes a first location with a first thickness and a second location with a second thickness, wherein the first thickness is greater than the second thickness.

4. The gas turbine engine as claimed in claim 1, wherein the gas seal includes a w-shaped seal positioned between the radial diffuser assembly and the another diffuser.

5. The gas turbine engine as claimed in claim 1, wherein the gas seal comprises:
   a first seal flange attached to the wall of the another diffuser;
   a second seal flange attached to the second wall of the radial diffuser assembly; and
   a w-seal positioned between the first seal flange and the second seal flange.

6. The gas turbine engine of claim 1, wherein the bleed slot positioned within the shroud and proximate the centrifugal impeller is positioned within the shroud along an arcuate inner surface along vanes of the centrifugal impeller.

7. The gas turbine engine of claim 1, wherein the pair of flanges extend approximately orthogonal with respect to a centerline of the gas turbine engine.

8. A method of manufacturing a gas turbine engine comprising:
coupling a radial diffuser assembly to a shroud of a compressor assembly, wherein the radial diffuser assembly is positioned to receive compressed air from a centrifugal impeller, and wherein the radial diffuser assembly includes a first arcuate wall and a second wall;
coupling a second diffuser to the radial diffuser assembly to receive the compressed air from the radial diffuser assembly; and
coupling a gas seal between the second wall and a wall of the second diffuser, the gas seal configured to prevent the compressed air from passing through the seal while allowing relative motion between the radial diffuser assembly and the second diffuser;
forming a bleed slot within the shroud proximate the centrifugal impeller;
forming a bleed plenum with the steps of:
attaching a non-load bearing material to the radial diffuser assembly via a pair of flanges that are in direct contact with one another; and
attaching the non-load bearing material to the shroud;
wherein bleed air that passes through the bleed slot passes directly from the centrifugal impeller, through the bleed slot, and into the bleed plenum.

9. The method as claimed in claim 8, further comprising forming the first arcuate wall of the gas turbine having a variable thickness about an arcuate portion of the first arcuate wall.

10. The method as claimed in claim 9, further comprising:
forming an outer structure; and
attaching a radial diffuser assembly to the outer structure;
wherein the variable thickness includes a first location with a first thickness and a second location with a second thickness, wherein the first thickness is greater than the second thickness, and wherein the first location is closer to a bolted joint than the second location.

11. The method as claimed in claim 8, the method further comprising:
attaching a first seal flange to the wall of the second diffuser;
attaching a second seal flange to the second wall of the radial diffuser assembly; and
positioning a w-seal between the first and second seal flanges to form the gas seal coupled between the second wall and the wall of the second diffuser.

12. The method of claim 8, wherein the bleed slot positioned within the shroud and proximate the centrifugal impeller is positioned within the shroud along an arcuate inner surface along vanes of the centrifugal impeller.

13. The method of claim 8, wherein attaching the non-load bearing material to the radial diffuser assembly via the pair of flanges, further comprises attaching such that the pair of flanges extend approximately orthogonal with respect to a centerline of the gas turbine engine.

14. A gas turbine engine comprising:
a radial diffuser coupled to a shroud of a compressor assembly, the compressor assembly rotationally coupled to a shaft, the compressor assembly having a centrifugal impeller, wherein the radial diffuser is positioned to receive compressed air from the centrifugal impeller;
a near-axial diffuser coupled to the radial diffuser and positioned to receive compressed air from the radial diffuser;
a gas seal coupled between a wall of the radial diffuser and a wall of the near-axial diffuser;
a bleed slot positioned within the shroud proximate the centrifugal impeller; and
a bleed plenum formed in part by a wall of the shroud and by a non-load bearing material that is attached to the radial diffuser assembly and to the shroud via a pair of flanges that are in direct contact with one another, wherein bleed air that passes through the bleed slot passes directly from the centrifugal impeller, through the bleed slot, and into the bleed plenum.

15. The gas turbine engine as claimed in claim 14, wherein the gas seal is configured to prevent compressed air from passing through the seal while allowing relative motion between the radial diffuser and the near-axial diffuser.

16. The gas turbine engine as claimed in claim 14, wherein the radial diffuser includes a first arcuate wall and a second wall, and wherein the first arcuate wall includes a variable thickness about an arcuate portion thereof.

17. The gas turbine engine as claimed in claim 16, the gas turbine engine further comprising an outer structure that is bolted at a joint to the radial diffuser, wherein the variable thickness includes a first location with a first thickness and a second location with a second thickness, wherein the first thickness is greater than the second thickness;
wherein the near-axial diffuser further comprises a vaned assembly having one or more service struts configured to pass a fluid therethrough.

18. The gas turbine as claimed in claim 14, wherein the gas seal comprises:
a first seal flange attached to the wall of the near-axial diffuser;
a second seal flange attached to the second wall of the radial diffuser; and
a w-seal positioned between the first flange and the second flange.

19. The gas turbine of claim 14, wherein the bleed slot positioned within the shroud and proximate the centrifugal impeller is positioned within the shroud along an arcuate inner surface along vanes of the centrifugal impeller.

20. The gas turbine engine of claim 14, wherein the pair of flanges extend approximately orthogonal with respect to a centerline of the gas turbine engine.

* * * * *